United States Patent [19]

Williamson

[11] Patent Number: 5,020,266

[45] Date of Patent: Jun. 4, 1991

[54] OFF-SHORE FISHING LURE

[76] Inventor: John G. Williamson, 28, Ridge Road, La Lucia, Durban, South Africa

[21] Appl. No.: 356,455

[22] Filed: May 24, 1989

[30] Foreign Application Priority Data

Jul. 4, 1988 [ZA] South Africa ............................ 884755
Pat. No. 0,965

[51] Int. Cl.⁵ ............................................. A01K 85/00
[52] U.S. Cl. ................................... 43/42.39; 43/42.47
[58] Field of Search ................. 43/42.45, 42.25, 42.28, 43/42.37, 42.47, 42.39

[56] References Cited

U.S. PATENT DOCUMENTS

| | | | |
|---|---|---|---|
| D. 191,051 | 8/1961 | Miller | 43/42.37 |
| D. 202,112 | 8/1965 | Storm | 43/42.45 |
| 1,700,061 | 1/1929 | Kimmich | 43/42.47 |
| 2,283,960 | 5/1942 | Wade | 43/42.47 |
| 2,313,709 | 3/1943 | Dunkelberger | 43/42.47 |
| 2,482,466 | 9/1949 | Cooper | 43/42.47 |
| 3,212,209 | 10/1965 | Irvin | 43/42.45 |
| 3,426,467 | 2/1969 | Bryant | 43/42.28 |
| 3,716,937 | 2/1973 | Santosuosso | 43/42.47 |
| 3,729,850 | 5/1973 | Waters | 43/42.39 |

Primary Examiner—Kurt Rowan
Attorney, Agent, or Firm—Duckworth, Allen, Dyer & Doppelt

[57] ABSTRACT

A fishing lure includes a weighted head member having a leading, downwardly and forwardly angled planar front surface which causes the weighted head member to dive downwardly while oscillating, and further includes a generally planar fin attached to the head member and extending above the head member when the lure is moving through the water. Either an artificial skirt or live bait is attached to a rearwardly tapered body portion.

5 Claims, 1 Drawing Sheet

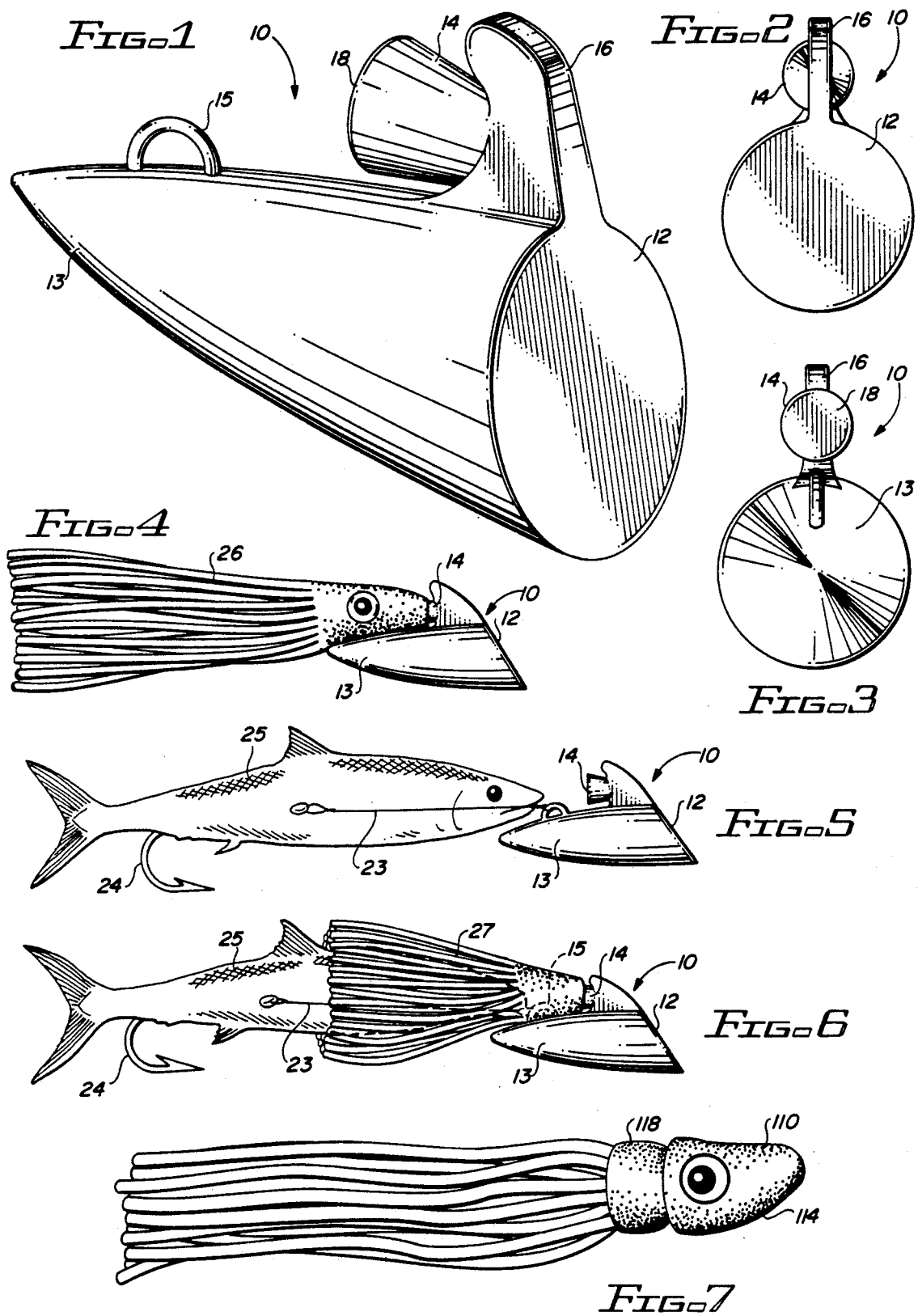

5,020,266

OFF-SHORE FISHING LURE

BACKGROUND OF THE INVENTION

It is common knowledge amongst fishermen of all categories that the type of lure that is used plays an important role in the success or otherwise of a fishing outing. This is particularly the case in off-shore fishing for game fish and endeavours to perfect the ideal lure with optimum affectiveness have pre-occupied the minds of various people involved in the manufacture of such lures. Most lures designed for game fishing are pulled from the front of the head, resulting in the lure being trolled through the water in a slightly elevated position. Even where, as in some cases, the head of the lure is weighted, the optimum effectiveness in presenting a more life-like appearance to attract the game fish is not achieved.

SUMMARY OF THE INVENTION

The object of the invention for which a Patent is sought and which is described hereunder, is to provide a game fish lure which incorporates a novel concept in its constructon, designed to present a more life-like appearance of an actual fish. Read in conjunction with the attached drawing and explanatary details, the novelty of this lure lies in the fact that the head of the lure is weighted in a pre-determined and irregular manner, in such a way that the head vibrates as it is pulled through the water and by so doing, has the effect of enhancing the oscillation of the skirt from side to side. The construction of the lure, in addition to a flatly constructed forefront of the head, also provides for the fishing line to be attached high up on the crown of the head as shown, both features of which further enhances the life-like appearance of the lure by presenting it as a vigorously moving fish in the diving position. This, together with its vibrating head and the increased movement of the skirt would also, in certain cases, present the image of a fish in distress which, as many of the fishing fraternity will contend, is an added attraction for game fish seeking prey. The lure may be constructed from any suitable material and the shape and dimensions may be varied as required, as for example, the adaption of this concept for manufacturing lures for other categories of fish.

THE DRAWING

FIG. 1 is a perspective view of the off-shore fishing lure of the present invention.

FIGS. 2 and 3 are front and rear elevations, respectively, of the present invention.

FIGS. 4, 5 and 6 are side views illustrating the manner in which the lure of the present invention is utilized with various artificial and natural baits.

FIG. 7 is another embodiment of the present invention.

DETAILED DESCRIPTION

A preferred embodiment of the present invention will now be described with reference to FIGS. 1-6.

Noting FIGS. 1-3, the present invention includes an elongated fishing lure head member 10 having a leading, downwardly and forwardly angled planar front surface 12. The head member further includes a trailing, rearwardly and inwardly tapered, generally conical rear surface 13 and a thin-shaped, generally planar portion 14 extending upward from the conical surface 13. The thin-shaped planar portion 14 has a front edge 16 which forms a part of the front surface 12, and further includes a rear edge 18.

Means, such as an eyehook 20, are porvided for attaching a fishing line 21 to the front edge 16 for drawing the head member through the water and lead by the front surface 12, 16. Means, such as barb 22 are further provided for attaching a skirt 26 or natural bait 25 to the conical rear 13 for trailing the skirt 26 or natural bait 25 through the water behind the head member 10, including the thin-shaped portion 14. Further means, such as an additional eyehook 15, are also provided along the rear conical surface 13 for attaching a hook 24 and line 23 to the head member 10 in general alignment with the head member. As shown in FIG. 6, an additional artificial skirt 27 may be used with the natural bait 25 to provide further rippling action for attracting fish.

As described above, the head member 10 and its forwardly angled, planar front surface 12 together with the other features including the conical rear surface 13 and the thin-shaped planar portion 14, cause the lure to be weighted in a predetermined and irregular manner so that the head member vibrates as it is pulled through the water. In so doing, this has the effect of enhancing the oscillation of the natural bait and/or skirt (26 or 25 in FIGS. 4-6) from side to side. This enhances the life-like appearance of the lure by presenting it as a vigorously moving fish in the diving position and together with the vibrating head member increases movement of the skirt which also presents the image of a fish in distress, thus further attracting game fish seeking prey.

An alternate embodiment of the present invention is shown in FIG. 7. There, the lure including the head member is referred to by the reference numeral 110 and includes a leading, downwardly and forwardly angled planar front surface 114 and a trailing, rearwardly and tapered generally conical rear surface 118. Means 116 are provided for attaching a fishing line 117 to the head member for attaching a skirt to the rear of the conically shaped portion.

What is claimed is:

1. A fishing lure, comprising:
an elongated head member having a leading, downwardly and forwardly angled planar front surface; a trailing, rearwardly and inwardly tapered, generally conical rear surface; a fin-shaped, generally planar portion extending up from said conical surface and having a front edge which forms a part of said front surface and a rear edge;
means for attaching a fishing line to said front edge for drawing said head member through water led by said front surface;
means for attaching a skirt to said rear edge for trailing said skirt through water behind said fin-shaped portion; and
means located on said rear surface for attaching a hook to said head member in general alignment with said elongation of said head member.

2. A fishing lure comprising:
a weighted head member having a leading, downwardly and forwardly angled planar front surface and a rearwardly tapered body portion;
a generally planar fin attached to the head member and extending above the head member when the lure is moving through the water;
means for attaching a fishing line adjacent a forward portion of the fin;

means for attaching an artificial skirt or live bait to the rearwardly tapered body portion; and wherein the head member has a weight sufficient to cause the lure to sink, and the angled planar front surface causes the lure to dive and oscillate.

3. The fishing lure recited in claim 2, further comprising means for attaching a fishing hook to the rearwardly tapered body portion.

4. The fishing lure recited in claim 2, wherein the means for attaching an artificial skirt or live bait comprises a vertically upstanding barb.

5. The fishing lure recited in claim 2 wherein the fin has a forward face co-extensive with the planar front surface of the head member.

* * * * *